UNITED STATES PATENT OFFICE.

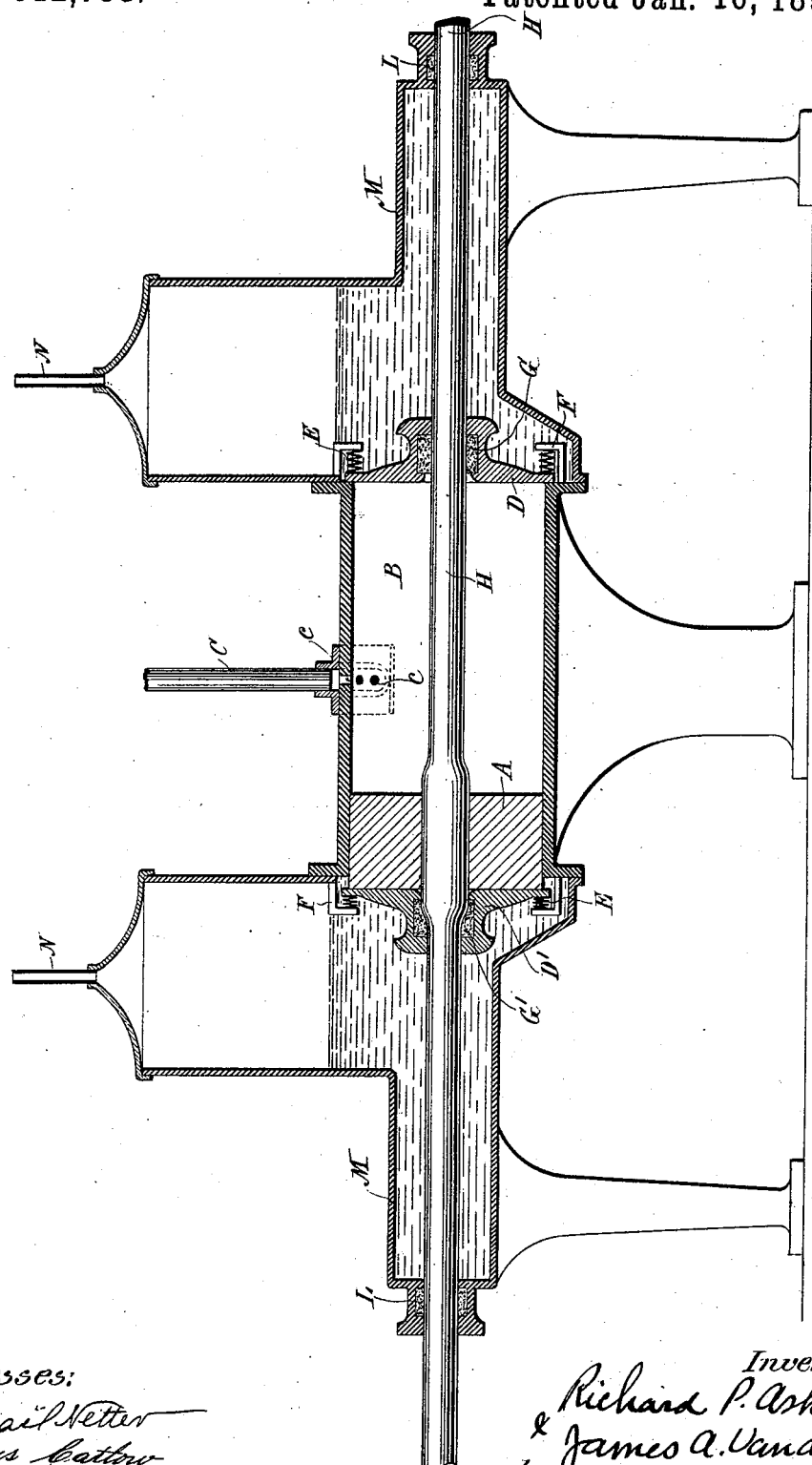

RICHARD P. ASHWELL, OF NEWARK, NEW JERSEY, AND JAMES A. VANDEGRIFT, OF NEW YORK, N. Y.

VACUUM-PUMP.

SPECIFICATION forming part of Letters Patent No. 512,788, dated January 16, 1894.

Application filed February 21, 1893. Serial No. 463,207. (No model.)

*To all whom it may concern:*

Be it known that we, RICHARD P. ASHWELL, residing at Newark, in the county of Essex and State of New Jersey, and JAMES A. VANDEGRIFT, residing at New York, in the county and State of New York, citizens of the United States, have invented certain new and useful Improvements in Vacuum-Pumps, of which the following is a specification, reference being had to the drawing accompanying and forming a part of the same.

Our present invention is embodied in a mechanical exhaust pump, the improvements which constitute the invention being designed with the object of simplifying the construction of such apparatus and at the same time increasing its efficiency, both as to rapidity of action and the degree of exhaustion which it is capable of effecting.

In carrying out our invention we make use of a cylinder and a piston therein which we arrange to operate as a double-acting pump or one which exhausts twice in every complete revolution of the crank or stroke of the piston, by connecting an induction passage with the center of the cylinder, and providing for the escape of air at the ends of the same. The piston itself is solid or without valves, and serves as a valve to open and close the induction passage or port by its movement with respect to the same, so that no special valves are required for such passage. We also utilize the cylinder heads as valves, providing means for positively opening and closing them at proper intervals, and we provide at the ends of the cylinder, chambers into which the said heads open, and which are designed to contain oil, mercury or the like, which serves as a seal for the valves.

Our invention consists in a piston rod of special construction for use in an apparatus of the character above described, the same being enlarged for a given distance on opposite sides of the piston for the purpose of raising from their seats the cylinder heads through which it passes.

The figure represents in vertical longitudinal section an apparatus constructed in accordance with our invention.

B is the main or exhaust cylinder in which works a solid close-fitting piston A, carried by a piston rod H, that extends through the opposite heads of the cylinder. A pipe or tube C leads from the chamber or device to be exhausted and communicates with the interior of the cylinder B midway between its ends, and preferably through a number of small holes *c*; these being better than a larger single opening or slot as they do not impair to such an extent the bearing surface for the piston. The heads of the cylinder B are plates D D' that fit smoothly over the ends of the cylinder, the surfaces in contact being ground or trued so as to obtain a good mechanical joint. The heads D D' are held in position in their seats of the cylinder by springs E interposed between the heads and brackets or standards F. These springs have also the function of cushioning the cylinder heads when raised off their seats in or by the operation of the pump, and thus preventing shocks and injurious pounding. The piston A is fixed to the rod H, and the latter works through stuffing-boxes G in the cylinder heads. The glands or packing in these stuffing-boxes is composed of an elastic or expansible material such as india-rubber. On each side of, and for a short distance from the piston, the rod is slightly enlarged in diameter, so that when the enlarged portion of the rod enters the packing it forces the cylinder head off from its seat in advance of the piston. The stroke is so regulated that the piston passes slightly beyond the ends of the cylinder. The cylinder opens into chambers M, provided with stuffing-boxes L through which the piston rod passes. These chambers are preferably inclosed and provided with vent pipes N that carry off the air forced out by the piston.

The apparatus is composed of iron or steel or other suitable material and is properly braced and supported.

The action or operation of the apparatus is as follows: Starting from the right-hand end of the cylinder B the piston A, in moving toward the left first closes communication between the left half of the cylinder and the chamber to be exhausted, by passing over and beyond the eduction ports *c*. The passage of the smaller portion of the piston rod through the stuffing-boxes does not move the cylinder heads off from their seats against the force of the springs E, and of the mercury or oil that may be placed in chambers M, but when the enlarged portion of the piston rod H begins to pass through the stuffing-box G' the cylinder head or valve D' is opened as far as the springs E and brackets F will permit, and the air or gas ahead of the piston will be forced out around the head. The piston at the extreme end of its stroke will project beyond the end of the cylinder, and being in close contact with the inner face of the cylinder head, will do away with all clearance space, and thoroughly expel the last trace of air or gas from the cylinder. The return of the piston is accompanied by a similar operation of the devices at the opposite end of the cylinder. When the piston begins to return from the end of the cylinder, the valve D moves with it and in contact with it until the cylinder is tightly closed. The chambers M are filled to a point above the level of the openings in the cylinder with oil or mercury which prevents access of air into the cylinder should any small leaks exist between the valves and their seats.

By an apparatus such as we have now described, the conditions of operation of some forms of high vacuum mercury pumps are closely imitated and a very efficient and economical action secured.

What we claim as of our invention is—

1. The combination with the cylinder of an exhaust pump, having an induction port located midway between its ends, of movable heads forming eduction valves, a reciprocating piston and a piston rod passing through expansible packings in the cylinder heads and having portions of increased diameter for raising the heads from their seats, as set forth.

2. The combination with the cylinder of an exhaust pump, of the movable cylinder heads constituting eduction valves, a piston rod passing through expansible packings in said heads, a piston fixed to the rod, which is of increased diameter on each side of and for a pretermined distance from said piston, as set forth.

RICHARD P. ASHWELL.
JAMES A. VANDEGRIFT.

Witnesses:
G. A. BOOTH,
ED BEESLEY.